(12) United States Patent
Pettersson et al.

(10) Patent No.: US 8,112,111 B2
(45) Date of Patent: Feb. 7, 2012

(54) ACCESS SELECTION IN WIRELESS NETWORKS

(75) Inventors: Mattias Pettersson, Lund (SE); Conny Larsson, Täby (SE)

(73) Assignee: Telefonaktiebolget LM Ericsson (publ), Stockholm (SE)

( * ) Notice: Subject to any disclaimer, the term of this patent is extended or adjusted under 35 U.S.C. 154(b) by 611 days.

(21) Appl. No.: 11/720,870

(22) PCT Filed: Dec. 6, 2004

(86) PCT No.: PCT/SE2004/001811
§ 371 (c)(1),
(2), (4) Date: Jul. 22, 2009

(87) PCT Pub. No.: WO2006/062445
PCT Pub. Date: Jun. 15, 2006

(65) Prior Publication Data
US 2009/0298496 A1     Dec. 3, 2009

(51) Int. Cl.
*H04W 36/00* (2009.01)
*H04M 1/00* (2006.01)
(52) U.S. Cl. ................... 455/552.1; 455/441
(58) Field of Classification Search ............. 455/552.1, 455/441
See application file for complete search history.

(56) References Cited

U.S. PATENT DOCUMENTS 5,396,645 A * 3/1995 Huff .................. 455/441
6,480,716 B2 * 11/2002 Salonaho ........... 455/441

FOREIGN PATENT DOCUMENTS

EP   1 585 354 A1   10/2005
JP   2002-027519    1/2002

OTHER PUBLICATIONS

Majiesi, Al, Khalai, B., "An Adaptive Fuzzy Logic Based Handoff Algorithm for Interworking Between WLANs and Mobile Networks" PIMRC IEEE 2002, vol. 5, pp. 2445-2551.
Austin, Mark D. and Stuber, Gordon L., "Velocity Adaptive Handoff Algorithms for Microcellular Systems", IEEE Trans. Veh. Techn., vol. 43, pp. 549-551.

* cited by examiner

*Primary Examiner* — Marivelisse Santiago Cordero

(57) ABSTRACT

In a communication system including mobile terminals and different wireless networks the mobile terminals can estimate the speed with which the mobile terminals move and communicate estimated values of the speed to a selection function (17) selecting one of the wireless networks communicating information from and to the respective mobile terminal. In the estimating, first estimated speeds and/or positions of a mobile terminal are determined (11) particularly for each of the wireless networks, from the communication with the particular wireless network. Then the estimated values are by special interfaces (11) input to a different speed estimation function (15) in which a combined value of the speed of the mobile terminal is calculated, according to a speed estimation algorithm and is input to the selection function. In this speed estimation also a recommended one of the wireless networks can be determined. The functions for estimating the speed are divided between a network layer (L3) and lower layers (L2, L1).

40 Claims, 8 Drawing Sheets

ACCESS SELECTION IN WIRELESS NETWORKS

FIELD OF THE INVENTION

The present invention relates to a communication system and a method for transmitting information in which values of the speed with which a mobile terminal is moving are used to improve access selection, in particular in a heterogeneous communication system including different kinds of networks.

BACKGROUND

A mobile terminal may have multiple interfaces allowing it to connect over multiple link layers (L2s) to different access networks.

Some access networks are likely to be preferred to others, as they provide higher bandwidths, a lower latency, a better support for fast moving terminals or lower costs. For instance, a Wireless Local Area Network (WLAN) is not designed for moving terminals at all, albeit slow movements of the terminals are possible and can be handled, whereas cellular systems are designed to be also used for providing communication with fast moving terminals such as terminals used in cars and trains. On the other hand, all access networks are not available in every geographical location.

If a mobile terminal moves from a location covered only by a wide-area access network, e.g. a cellular network, into a location that is also covered by a local-area access network, e.g. a WLAN, the mobile terminal may want to take a decision on whether to continue to use the wide-area access network or make a handoff to the local-area access network.

Existing work in regard of multi-access has been directed to devising different methods for detecting network topological movement and the access network/method to prefer.

Existing work in regard of detecting geographical information has been focused on how to determine the absolute position of a mobile terminal, in order to enable positioning services or localizing services.

Existing work in regard of improving access selection in the Network/IP (Internet Protocol) layer L3 using information collected on the physical layer, L1, and on the link layer, L2, has been very limited as to the implementation. Cellular links are usually represented as point-to-point (PPP) links, where the entire nature of the physical radio communication is hidden from the network layer L3. WLAN links are only represented as Ethernet links, in which the only information propagated upwards is "link up/down". Of course, the network layer L3 should generally be unaware of the detailed characteristics of the link, i.e. of the exact transfer of information, but a management mechanism on the network layer L3, such as an access selection mechanism/function, should still be aware of the dynamics of data transmission over the links.

Work has been done in regard of using speed-estimation and fuzzy logic in order to aid handoff decisions between hybrid networks such as combined cellular and WLAN networks. The disclosed hand-off decisions are used in mobile terminals or choosing en access network/access method that can handle the speed with which the mobile terminals are moving.

Problems Associated with Existing Solutions

A handoff such as described above from a cellular network to a WLAN may require some time, such as a time period of the magnitude of order of 1-10 seconds, to be completed in the case where mobility mechanisms based on the IP-layer are used.

If the mobile terminal is geographically quickly moving out of the area covered by the WLAN it will not make any sense to try to handoff into it in the first place, only to then have to handoff out of it again a few seconds later.

Likewise, if the mobile terminal is geographically located in an area covered by an access network, which is lacking radio and network support for quickly moving mobile terminals/nodes, and the mobile terminal is moved into a vehicle, e.g. a bus, a car, or a train, that starts to move with a speed which would have serious impact on ongoing communication services, it would be useful for the mobile terminal to handoff to a radio access technology that is more appropriate for fast moving terminals.

It is important that the mobile terminal should use an access network/method that is designed for the speed with which the mobile terminal is moving.

Generally, a handoff may incur loss of packets, that packets are received out of order or a large variation of latency and should be considered well before being performed.

Topological Movement Detection

Detection of movement of a mobile terminal in the network topology is required to make handoffs on the network layer, L3. However, a detected movement in the network topology does not include a measure of the time during which the mobile terminal can be predicted to stay in the same subnet or to be connected to the same point of attachment, as there is no information on or estimation of the speed of the physical/geographical movement of the mobile terminal.

The existing work has focused on trying to minimize handoff effects or handoff duration. Most of the existing work has not been helpful in providing input to an access selection process on the anticipated time period during which the mobile terminal will stay in a particular cell, or to provide input to access selection that has to select between different types of access networks, where there is no coordination or cooperation between the cells or access networks of different types.

Positioning/Localizing

The existing work on positioning mobile terminals, also called localizing mobile terminals, has focused on how to determine the absolute, geographical positions of the mobile terminals, the work based on one or multiple cells belonging to one or multiple access networks. Thus, the existing work primarily deals with the problem of determining the position of mobile terminals, this problem generally being more complex than determining of only the geographical speeds of the mobile terminals.

A procedure and possible associated devices that can measure the absolute geographical position of a mobile terminal can obviously also be easily modified to also calculate the geographical speed of the mobile terminal. A problem associated with such a modification is that positioning or localizing procedures already are quite complex and that they already require a high level of calculations from the mobile terminal and/or information about the infrastructure, such as information on existing roads in a cell.

Information from Lower Layers to Network Layer L3

In existing implementations there is no common way for different lower layers to convey to higher layers any kind of information about the way in which the dynamic radio conditions change over time.

The general case is that lower layers express no information at all to higher layers, except information on the up/down status of links.

Most implementations of lower layers have their functionality split between a driver, i.e. a software program, and firmware/hardware. Whereas the firmware/hardware has detailed information about physical parameters such as signal strength, such information is not exposed upwards in the layer structure at all. When it is exposed, the difference as to the implementations varies enormously. Hence, there is no way for a procedure that is performed in the network layer L3 is independent of lower layers, such as an access selection procedure, to know where to read such information, if it can be read at all.

Coordinated Access Networks

Some of the current procedures for positioning a mobile terminal generally require that the mobile terminal is aware of some level of the geographical topology of the access network to which is connected.

Some of the current procedures for handling handoffs for a mobile terminal moving between different types of access networks require that there is some coordination or cooperation between the access networks. However, such coordination or cooperation may be a too complex requirement for a method in which the mobile terminal at each time instance is selecting a good or best access network.

Problems Associated with Existing Speed-Estimation Solutions

The solution and algorithm presented in the article for Majlesi et al. cited above does not point out how speed estimation is actually performed, but references e.g. Doppler frequency speed estimation proposals, that current hardware does not provide. A mathematically complicated algorithm for estimation of speed in a cellular network is disclosed in the cited article for Austin et al. This prior algorithm has to be executed in a base station.

Furthermore, the algorithm proposed in the cited article for Majlesi et al. is explicitly designed for hybrid networks consisting of combined cellular networks and WLANs. It cannot handle different lower layers in a generic manner, but is hardcoded with information about the two lower layers, i.e. about the cellular networks and the WLANs.

The previously disclosed algorithm does not open up for a combination of input from different decision-taking entities within a mobile terminal, such as applications, operator policies, or user preferences.

SUMMARY

It is an object of the invention to provide a wireless communication system in which position and/or speed information of a mobile terminal connected to a network in the wireless communication system is determined and collected in an efficient way to assist in handoff operations.

It is another object of the invention to provide a method in a wireless communication system for determining and collecting position and/or speed information of a mobile terminal connected in the wireless communication system in an efficient way to assist in handoff operations for the mobile terminal.

It is another object of the invention to provide a mobile terminal to be used in a wireless communication system, the mobile terminal adapted to determine and collect information of its position and/or its speed in an efficient way to assist in handoff operations for the mobile terminal.

A problem that the invention intends to solve is how to perform estimation of the speed of a mobile terminal in an efficient way, in particular how to achieve that data are efficiently determined, calculated and collected and efficiently used for determining good estimates of the speed of the mobile terminal.

Thus generally, a method and the devices required for performing the method are provided that supply information about the geographical movement of a mobile terminal to an access selection algorithm. The information is delivered in such a format that it is achieved that the access selection algorithm does not have to know details about each link layer or lower layer.

Each network interface and its associated driver, or the corresponding parts of lower layers, provide generic information about the movement and an estimation of the speed of the mobile terminal to a speed estimation algorithm in the network layer, the speed estimation algorithm combining all this information. The speed estimation algorithm in the network layer makes a decision and provides it to an over-all access selection algorithm also performed in the network layer, this latter algorithm assumed to be already existing in some shape or other in the mobile terminal, and assumed to possibly also be taking other input values in order to determine the access network that is to be preferred at each time.

Even inexact information about the approximate speed of the geographical movement of the mobile terminal will give such an algorithm the capability of making better predictions for handoffs of the mobile terminal between different networks and in some cases between different cells.

It should be observed that it is a very important decision not to handoff to a wireless network that cannot handle fast moving terminals when a considered mobile terminal is moving with a speed above a certain value.

An algorithm performed in the network layer can interpret information received or taken from lower layers and from this information produce a combined speed estimation based on information from a plurality of portions of a lower layer performed in the mobile terminal for different access devices or even performed in different network devices.

Thus, generally a communication system for communicating information is considered, in particular a wireless communication system. The communication system can include at least two wireless networks, these networks sometimes also called access networks, and these networks can be of different types. The communication system can also be considered to include a wireless network system having at least two access points, each of the access points having a different or individual covered area. The wireless network system can include a single wireless network, the access points then being the same kind, or it can include a plurality of wireless networks.

Furthermore, a mobile terminal for use in the communication system or being part of the communication system includes communication circuits for wirelessly communicating with each of the at least two wireless networks and/or the at least two access points. Each of the communication circuits includes in turn a plurality of circuit blocks for each performing a specific function in the communication between the mobile terminal and at least one of access points in at least one of the at least two wireless networks or at least one of the access points of the wireless network system. Such a circuit block can include electronic circuits specific to the function that the block performs and/or general electronic circuits shared by a plurality of circuit blocks together with a memory or a portion of a memory specific to the circuit block, the general electronic circuits operating according to information stored in the memory or in said portion of the memory. Speed estimation circuit blocks for performing speed estimation functions are provided for estimating, according to suitable algorithms, the speed with which the mobile terminal moves and communicate estimated values of said speed to a selection module, that can be a selection circuit block in the mobile terminal. The selection module performs a selection function and selects, based on the estimated values of the speed, one of the at least two wireless networks or one of the at least two access points, respectively, for communicating information from and to the mobile terminal.

First ones of the speed estimation circuit blocks can be particular for each of the at least two wireless networks and thus perform first parts of the speed estimating function. Then, each of the first ones estimates or determines, according to adapted algorithms, values of the current position and/or of the speed of the mobile terminal, the estimating or determining being based only on the communication with only access points of an individual one of the at least two wireless networks. In this case, a second, different one of the speed estimation blocks is connected to the first ones for receiving the estimated or determined values. The second one calculates, according to a speed estimation algorithm, a combined value of the speed of the mobile terminal, the calculating being based on said received estimated or determined values, and it thus performs a second part of the speed estimating function.

The circuit blocks of the communication circuits can be organized in a layer system that at least includes a network layer and at least one lower layer, Then, the network layer includes circuit blocks that handle the communication between the mobile terminal and the at least two wireless networks or wireless network system on a network level. The at least one lower layer includes circuit blocks that handle the physical transmission of information between the mobile terminal and access points of the at least two wireless networks or the wireless network system. Then, the first ones of the speed estimation blocks are included in the at least one lower layer and the second one of the speed estimation blocks is included in the network layer. Thus, the estimated values of the current position of or of the speed of the mobile terminal are transferred from the at least one lower layer to the network layer, where the transferring can be performed using a special interface.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
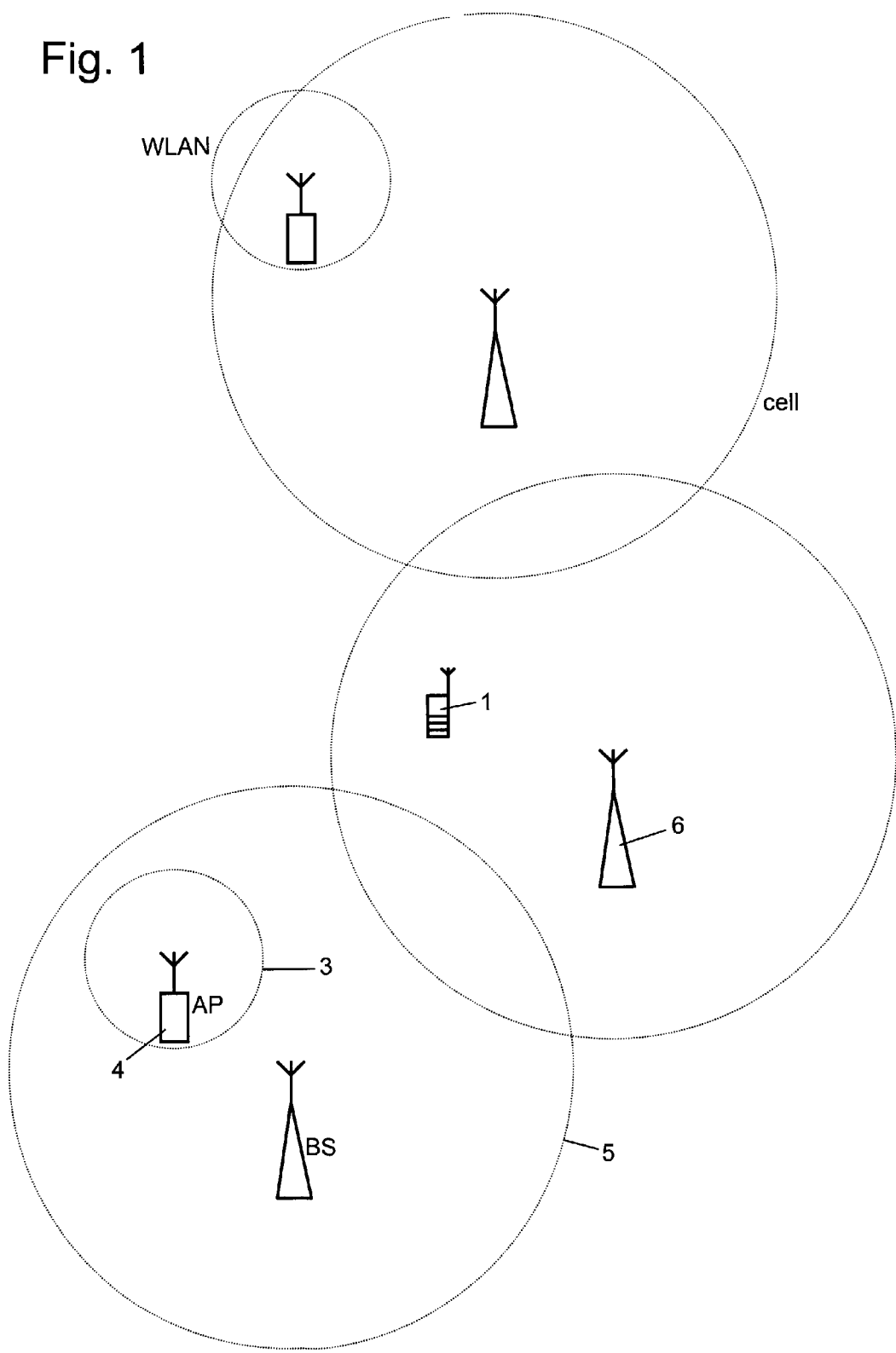
FIG. 1 is a schematic view of a communication system according to prior art and including a combination of wireless communication networks that can be of different kinds.

A communication system being a combination of wireless communication networks, "access networks", is illustrated in FIG. 1. Thus, a mobile terminal 1 can move, e.g. when placed in car, between areas that are covered by networks of different kinds. Thus, WLANs having rather small coverages or covered areas 3 around their access points (APs) 4 may be provided and one or more cellular networks, such as cellular TDMA (Time Division Multiple Access) networks, having larger areas of coverage or cells 5 around their base stations (BSs) 6, may also be provided. Of course the mobile terminal 1 should at each instant be connected to that one of the networks that is most suitable, i.e. provides the communication conditions which are in some sense the best ones. The term "access point", as used herein, is in a general sense taken to include all kinds of accessing devices used in wireless networks, including specifically access points in WLANs and base stations (BSs) in cellular networks.

Figure 2:
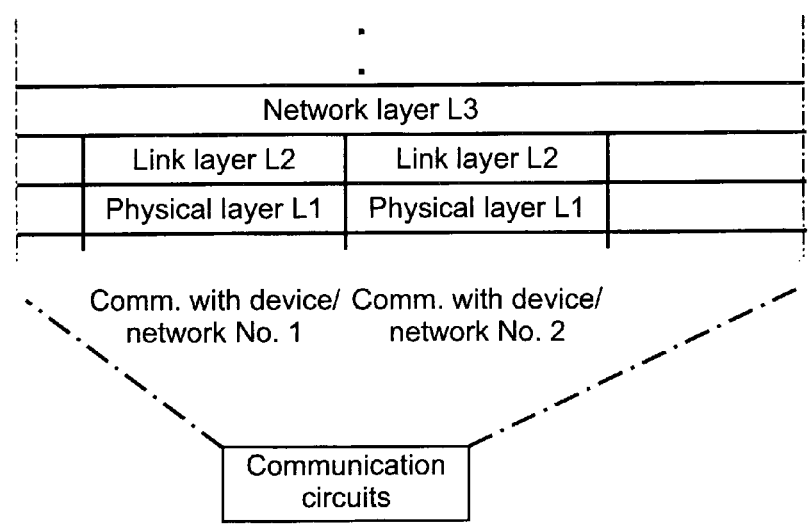
FIG. 2 is a principle view of a layer structure according to prior art used for communicating in a communication system or a communication network.

The communication between the mobile terminal 1 and the wireless networks can be considered as performed in different layers in a standard manner, see FIG. 2, in which the structure of lower layers used for communication between a mobile terminal and communication system is illustrated, the different layers assigned or having different tasks. Thus, at the bottom of the layer structure there is a physical layer L1 providing the electro-mechanical interface through which data moves among devices on the network and thus holding the hardware necessary for the communication. A next higher layer, the link layer L2, provides a system through which network devices can share communication channels and thus holds the most basic software procedures for allowing the wireless communication. The next higher layer is the Network/IP layer L3, herein called the network layer, containing procedures specific to the network or generally to the communication system in which the communication is made. Its main purpose is to decide which physical path the information should follow from the source of the information to the destination of the information. Also, higher layers may be provided but will not be discussed hereinafter. Each of the layers can be considered as performed or located in the different devices involved in the communication, i.e. both in the mobile terminal 1 and in the access points 4/base stations 6 as well as in central network monitoring units, not shown, and thus it can be said that at least some of the layers are divided to have a portion of the same level for each device. The tasks of the lower layers can in particular be performed in communication circuits of the mobile terminal, each task then specifically performed by general and/or special circuits of one of the communication circuits and associated memory cells or memory areas holding commands specific to the task.

Figure 3:
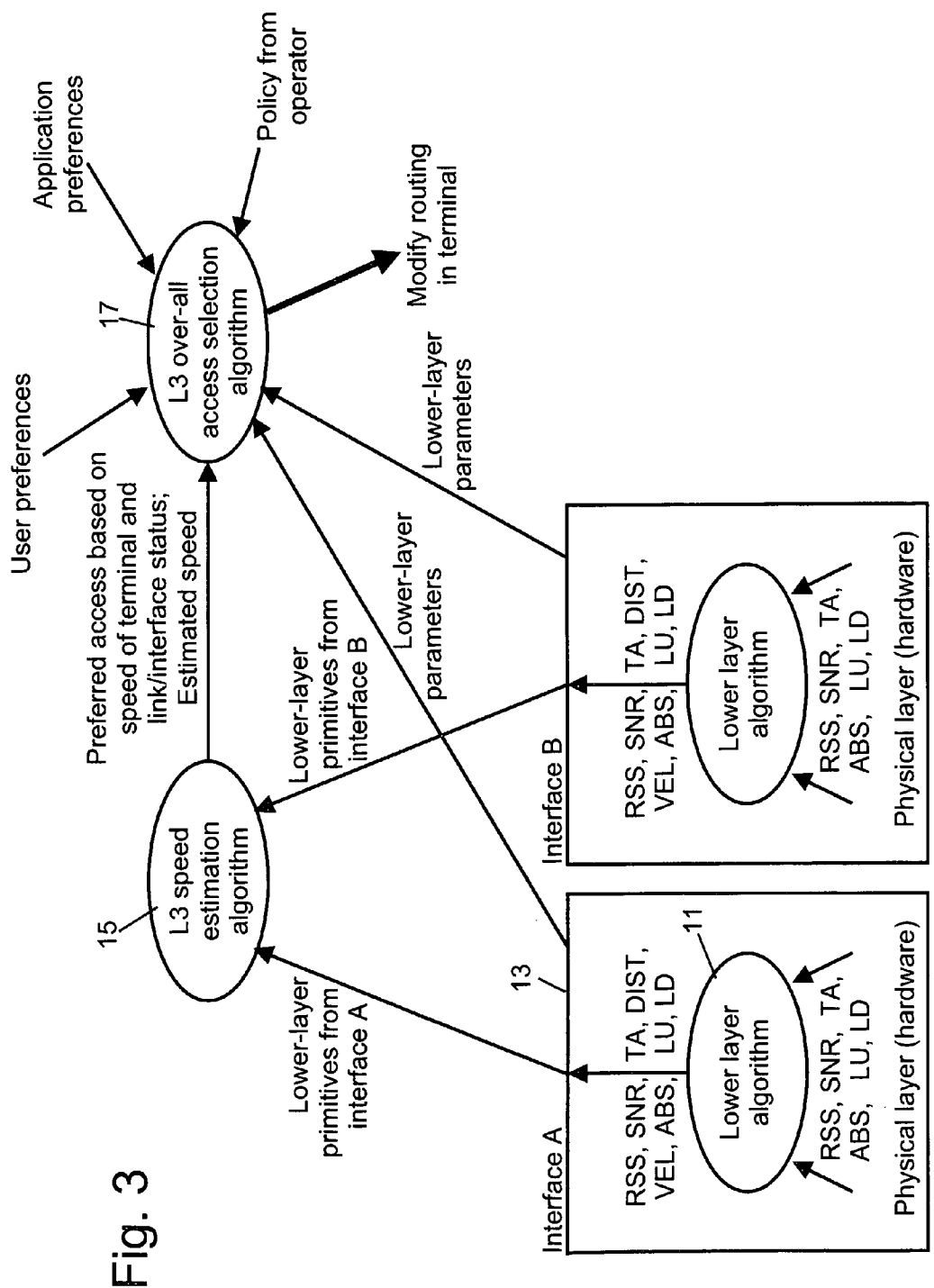
FIG. 3 is a schematic of different circuit blocks performing algorithms or procedures in a wireless communication system for selecting access in the communication system.
Figure 10:
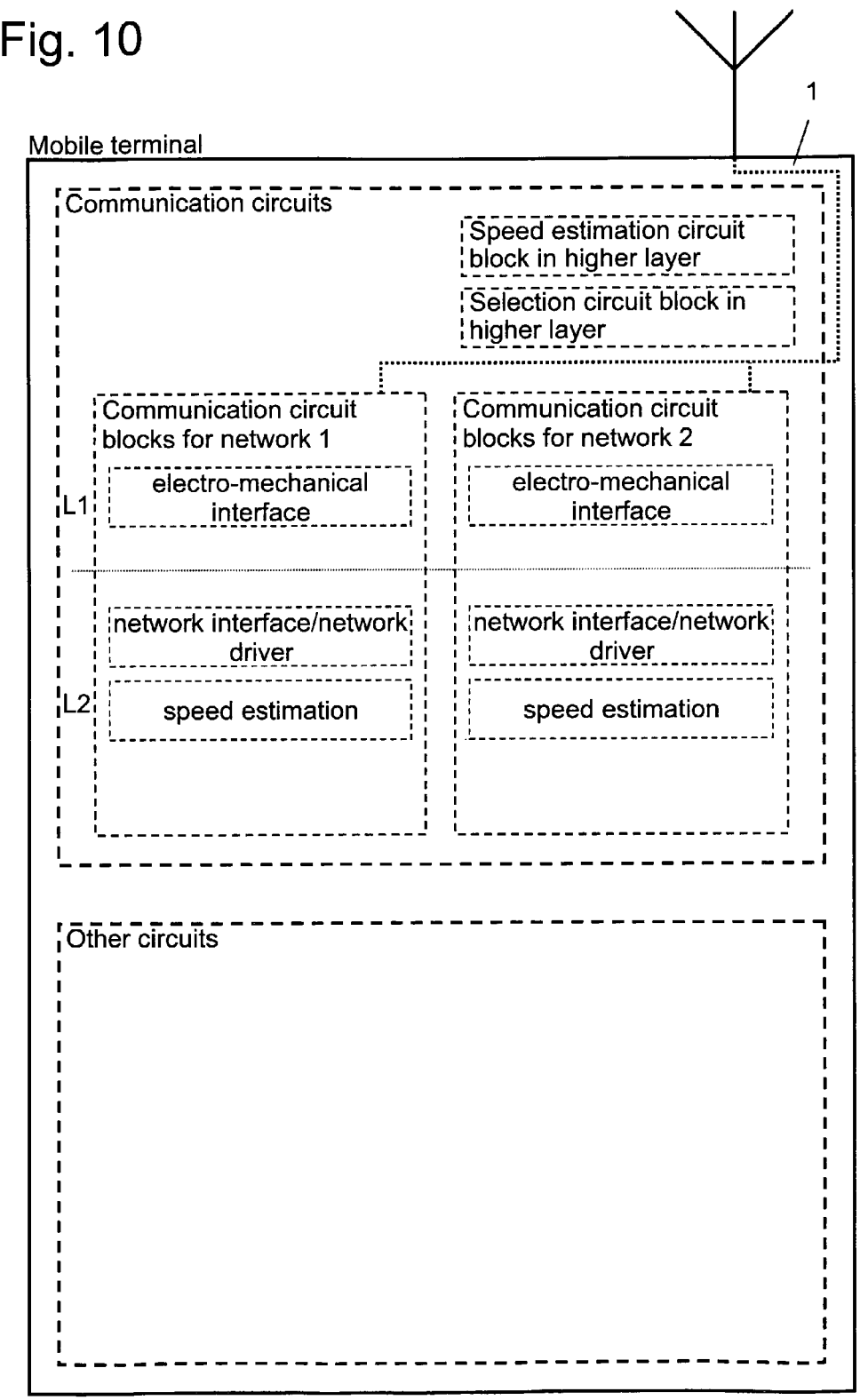
FIG. 10 is a block diagram of circuits in a mobile terminal.

Now a method and devices required therefor will be described allowing an efficient choice of access network for the mobile terminal 1 in a communication system including wireless networks primarily being of different kinds, the access network here being that wireless network to which the mobile terminal should be or is to be connected for communicating information, as seen in FIG. 1. The method and associated devices include four parts, at least some of which can be incorporated in a mobile terminal by a suitable modification of the software thereof, see the schematic of FIG. 3 illustrating the relation between the different parts and also the block diagram of FIG. 10:

1. Algorithms 11 are performed in circuit blocks in device specific parts of one or more lower layers, such as in parts of the physical layer, L1, or preferably in parts of the link layer, L2. Each of the algorithms measures, estimates or derives various parameters such received signal strength (RSS) and/or signal-to-noise ratio (SNR), timing advance (TA), etc. for the communication between the mobile terminal 1 and an access point 4, 6 of one of wireless networks included in the communication system. The algorithm 11 can also calculate, estimate or derive values of other parameters of interest for the communication between the mobile terminal and the access point.

2. Interfaces 13 between the lower layers and a higher layer, as illustrated in the network layer L3, are used for passing information contained in primitives, see the description hereinafter, from lower layers to the network layer L3 in a general format.

3. An algorithm 15 for speed estimation is performed in circuit blocks in the higher layer, i.e. the network layer L3, and takes input from all different lower layers, in particular from the algorithms 11 performed in the lower layers, and compiles the taken data to form an approximate, combined value of the speed of the current geographical movement of the mobile terminal 1. The algorithm 15 uses heuristics to decide whether the mobile terminal will stay within the same radio coverage area 3 or the same cell 5, associated with a given part of a lower layer such as the link layer L2, for some time to come or if it is quickly moving out of the radio coverage area or cell, or if the radio conditions are too bad or if the radio/cell coverage area is too crowded with mobile terminals already in communication.

4. An algorithm 17 for over-all access selection is performed in circuit blocks in a higher layer, such as the network layer L3, and uses the output provided by the speed estimation algorithm 15 as one of multiple input parameters to an over-all access selection mechanism that manages the network layer. Other input to the access selection mechanism can include input from applications, policies, user selection or network instructions.

Lower-Layer Algorithm 11

Figure 4:
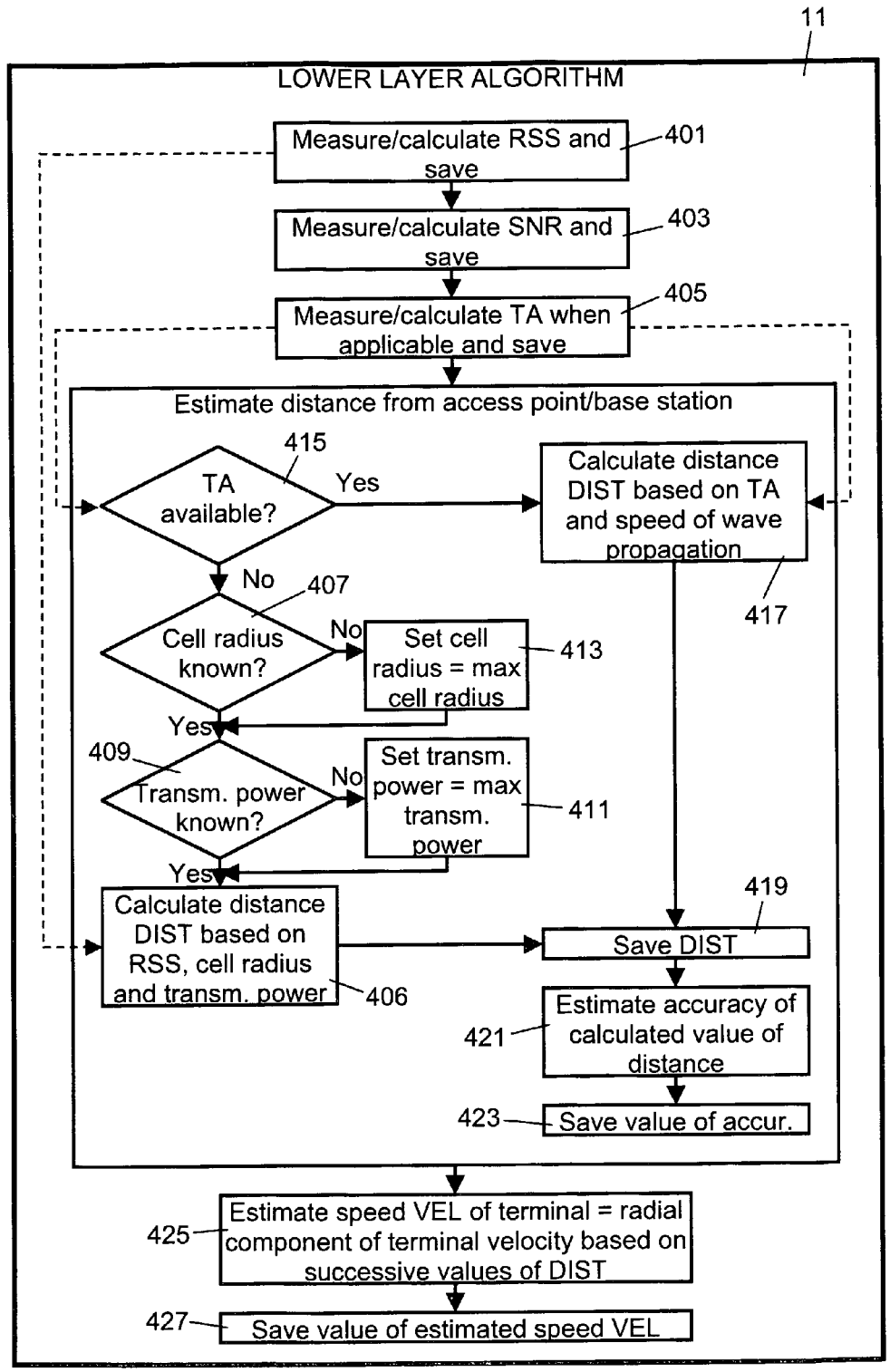
FIG. 4 is a block diagram of a circuit block for performing the lower layer algorithm of FIG. 3.

The lower-layer algorithm, see FIG. 4, is performed in the lower layers, in one of or in both of the physical layer L1 and the link layer L2. The lower layers are assumed to use some suitable methods, e.g. as disclosed in the prior art, to measure, estimate or otherwise derive values of different parameters that are to be used in calculations and subsequently sent or provided to the next higher layer, the network layer L3, together with values of other calculated, estimated or derived parameters.

—Directly Known Parameters—

Examples of parameters which an arbitrary lower layer L1 or L2 generally is capable of measuring or calculating include:

Strength of received signal (RSS), see block 401 in FIG. 4,
Signal-to-noise ratio (SNR), see block 403,
Timing advance (TA), however, this parameter is applicable only to cellular TDMA systems, see block 405.

These measurements can be implemented in hardware, firmware or as part of the software driver for the respective interface. Often the wireless interface already performs a number of measurements in order to determine whether a handoff operation is necessary.

—New Calculated Parameters—

In addition to these parameters, the lower layer or layers L1 and/or L2 can calculate a plurality of other parameters from the directly known parameters. For instance, the distance DIST from the access point 4/base station 6 can be estimated based on the strength of the received signal, see block 406, if the mobile terminal 1 can estimate the radius of the cell in which it is in current communication, see block 407, and estimate the transmitting power of the access point/base station with which it is currently communicating, see block 409. In some cases there is no way for the mobile terminal to know the cell size or the transmitting power, but the mobile terminal may still provide a good guess. For instance, the mobile terminal 1 can assume that the access point 4/base station 6 transmits at maximum power, see block 411, and thus uses the maximum cell radius, see block 413. Even if the estimate is rough and the result differs by an order of ten, it is still a better input than no input at all. Later, the accuracy of the parameters provided by the different lower-layers is considered. It is e.g. known that a WLAN cell 3 is much smaller than a cellular network cell 5, this providing an indication of the accuracy of the calculated value that then is an estimated value.

On the other hand, calculating the distance DIST of the mobile terminal 1 from a base station 6 based on the timing advance is much more straightforward, since the time and speed of wave propagation is known, see blocks 415 and 417.

The estimated value DIST of the distance of the mobile terminal 1 from an access point 4/base station 6 can be saved, see block 419, and the accuracy of the estimated value can be estimated and stored, see blocks 421 and 423.

The speed VEL of the mobile terminal 1 in relation to the access point 4/base station 6 can be calculated based on the way in which the distance changes over time, see block 425, and saved, see block 427.

—Limitations—

The estimation of the speed VEL with which the mobile terminal 1 is moving can in most cases only be estimated radially with respect to the access point 4/base station 6, with which the mobile terminal is in communication, i.e. only the radial component of the velocity of the moving terminal can be estimated. This is due to the fact that in most cases the received signal strength or the timing advance is the only real, changing input parameter, and this parameter is, ideally, only a function of the distance from the access point 4/base station 6.

Unfortunately, the tangential component of the velocity of the moving mobile terminal 1 is not known. In a worst case, in which the mobile terminal is moving in a circle around the access point 4/base station 6 at a constant radius, this mechanism will not be capable of estimating any movement at all.

Instead, it will report zero speed, since the radial component of the velocity of the mobile terminal all the time remains equal to zero.

However, as will be stated below, in the case where estimations of the speed of the mobile terminal 1 derived from information relating to the communication with a plurality of access points 4/base stations 6 that can be both within one access technology and be in different access technologies are combined, the radial-only estimations can supplement each other and provide a better estimation of the speed of the moving mobile terminal.

For example, a mobile terminal 1 can be moving in a direction, which is more radial with regard to the access point 4, 6 of one cell 3, 5, while the same movement then is likely to be more tangential with regards to the access point of another cell. The combination of such two radial components will cancel the risk of obtaining a zero speed estimation for a tangential-only movement, but at the same time provides a too low estimation of the speed of the mobile terminal since, in the case where the radial component in one cell 3, 5 is high, the radial component in another, neighbouring cell will be low.

Interface 13 from Lower Layer to Higher Layer

Figure 5:
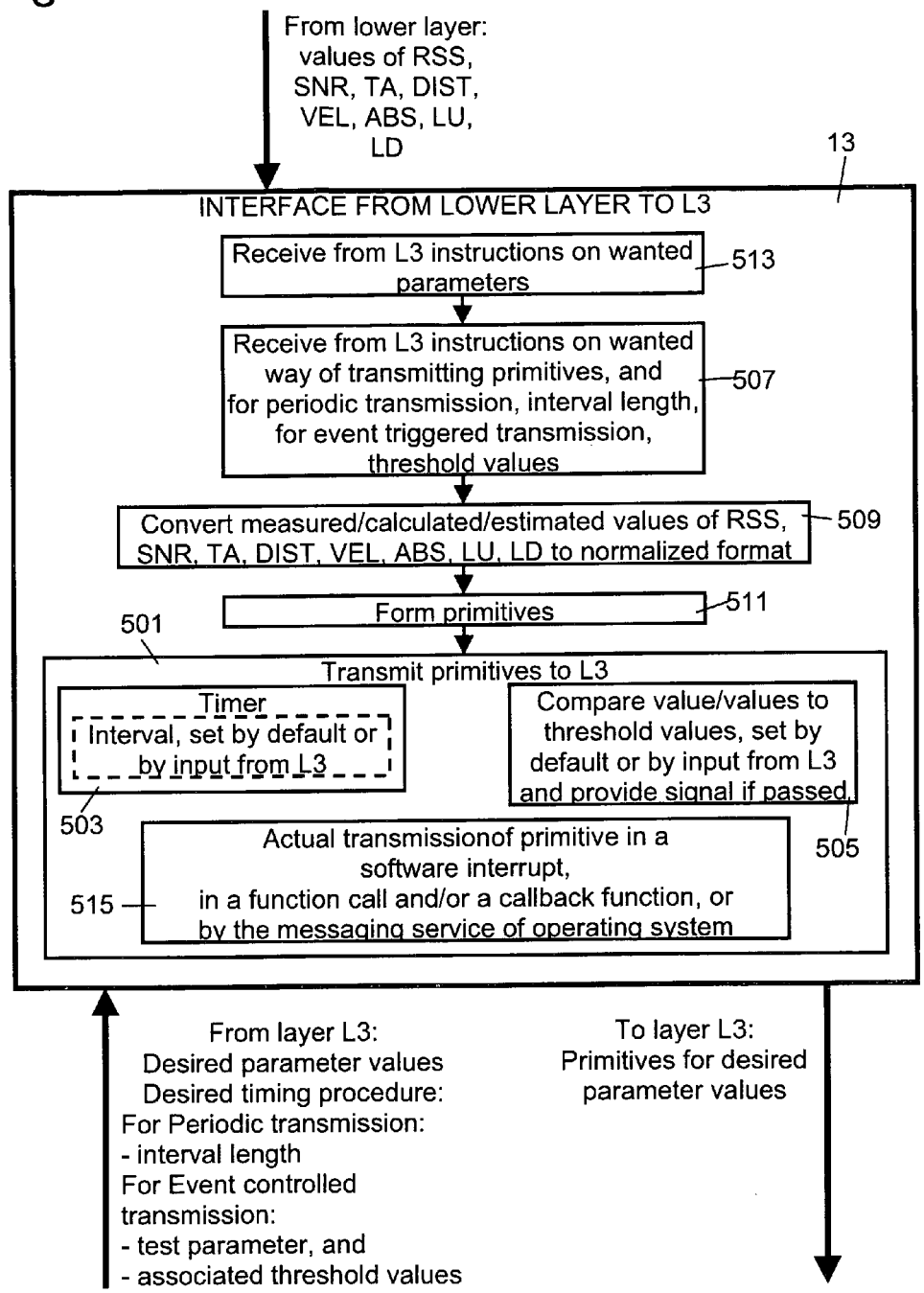
FIG. 5 is a block diagram of an interface between the lower layer algorithm of FIG. 3 and a network layer in the communication system.

Information that is measured and calculated in the lower layers L1 and/or L2 is transferred to the speed estimation algorithm 15 performed in the higher layer, the network layer L3, using the lower layer to L3 interface 13, see FIG. 5. In the description given herein, the term primitive is used to indicate an abstract form of such transferred information.

The idea behind the concept primitive is that the lower layers can provide a normalized format of radio-related information that can be used to compare radio conditions over different access technologies. Instead of specifying e.g. received signal strength in mW or dBm, the primitives use percent of maximum signal strength.

It is also expected that the lower layers are part of the driver software for the respective network interface and that a manufacturer of such interfaces will much better know how to normalize the information than a generic algorithm performed in the network layer L3 would know.

The term sending or transmitting primitives from one layer to another is to be taken abstractly. It is not to be interpreted as a transport of an information packet, a data packet or a similar thing which is the usual data passed between layers. For a discussion of a possible implementation, see the description hereinafter.

—Periodic or Event-Based Signaling—

Primitives may be sent from a lower layer to the network layer L3 periodically, at times occurring with a default interval, e.g. 10 ms, or with an interval that the network layer L3 can set, see the block 501 for transmitting primitives and its subblock 503 in FIG. 5.

Primitives may also instead be sent from a lower layer to L3 when a certain threshold, for example 90%, has been passed or exceeded, this threshold being a default value or set by the higher layer L3, see block 505. Each primitive may have several thresholds, for example at 10%, 30%, 50%, 70% and 90%. Passing a threshold will set off a trigger.

The network layer L3 is capable of specifying whether it wants primitives to be sent periodically or only be sent when triggered by passing a threshold, see block 507.

—Definitions of Primitives—

Primitives include, but are not limited to, the following parameters:

Received Signal Strength (RSS), i.e. the strength of the received signal, as normalized to 100%, i.e. it is specified in a dimensionless unit. As indicated above, the lower layers cannot tell which is the maximum value per access point 4, 6, unless they assume that all access points send at their maximum power.

Signal-to-noise ratio (SNR), normalized to 100%, i.e. it is dimensionless.

Timing advance (TA), only applicable to cellular TDMA systems and specified in meters, calculated from a measurement made in microseconds, between the mobile terminal 1 and the base station 6 with which it is in communication.

Distance (DIST) of the mobile terminal 1 from the access point 4/base station 6 with which it is in communication, the distance specified in meters. A lower layer holding an advanced algorithm 11 may be capable of calculating this information.

Speed (VEL) of the mobile terminal 1 in relation to the access point 4/base station 6 with which it is in communication, the speed specified in m/s.

Absolute position (ABS) of the mobile terminal 1, only applicable to GPS (Global Positioning System) receivers or future wireless communication systems and specified in geographical coordinates such as according to GIS (Geographical Information System). Also, a lower layer holding an advanced algorithm 11 may be capable of calculating this information. This calculation may require input from a plurality if access points 4/base stations 6, all of which of course being the same type.

Link up (LU).

Link down (LD).

The RSS, SNR, TA, DIST, and VEL primitives are associated with one access point 4/base station 6. Each primitive comes or is given or sent in a format such as <XX="value", BSid>, where XX is one of {RSS, SNR, TA, DIST, VEL}, for instance the strength of currently received signals from the access point or base station specified. The BSid parameter, e.g. BS1, BS2, . . . , is only an identifier of the base station for the higher layer L3 to map previous results to and can also be written e.g. APid, such as AP1, AP2 identifying different access points 4, 6 in a wireless network. It has no real meaning for the higher layer L3.

If multiple access points 4/base stations 6 are within the reach of the mobile terminal 1 and parameters of the communication with each of said access points/base stations can be measured or calculated, for each of said access points/base stations a set of primitives will be generated.

The ABS, LU and LD primitives are not associated with a particular access point 4/base station 6.

The parameter values received from lower layers are thus converted to the normalized values, see block 509, and the corresponding primitives are then formed, see block 511, in the interfaces 13.

Each type of primitive is sent independently of other types. That means that if some primitives can be measured, whereas others cannot be measured, the former ones are sent and the latter ones are suppressed. This may happen even though the measurement of each primitive is related to other primitives.

The higher layer L3 can specify the primitives which it wants to take or receive and the primitives which it does not want to take or receive, see block 513. The default setting will for the lower layers be to send all primitives for all access points 4/base stations 6 for which they can measure or calculate parameters associated with or derived from the communication with the access points/base stations.

—Implementation of Interface 13—

An implementation of the interfaces 13 between the lower layers and the higher layer L3 may for sending the primitives, see block 515, use any of:

Software interrupts,
Function calls and/or callback functions, and
Operating system messaging service.

It is up to the manufacturer of the operating system to decide the mechanism that is used.

Speed Estimation Algorithm 15 in Higher Layer

Figure 6:
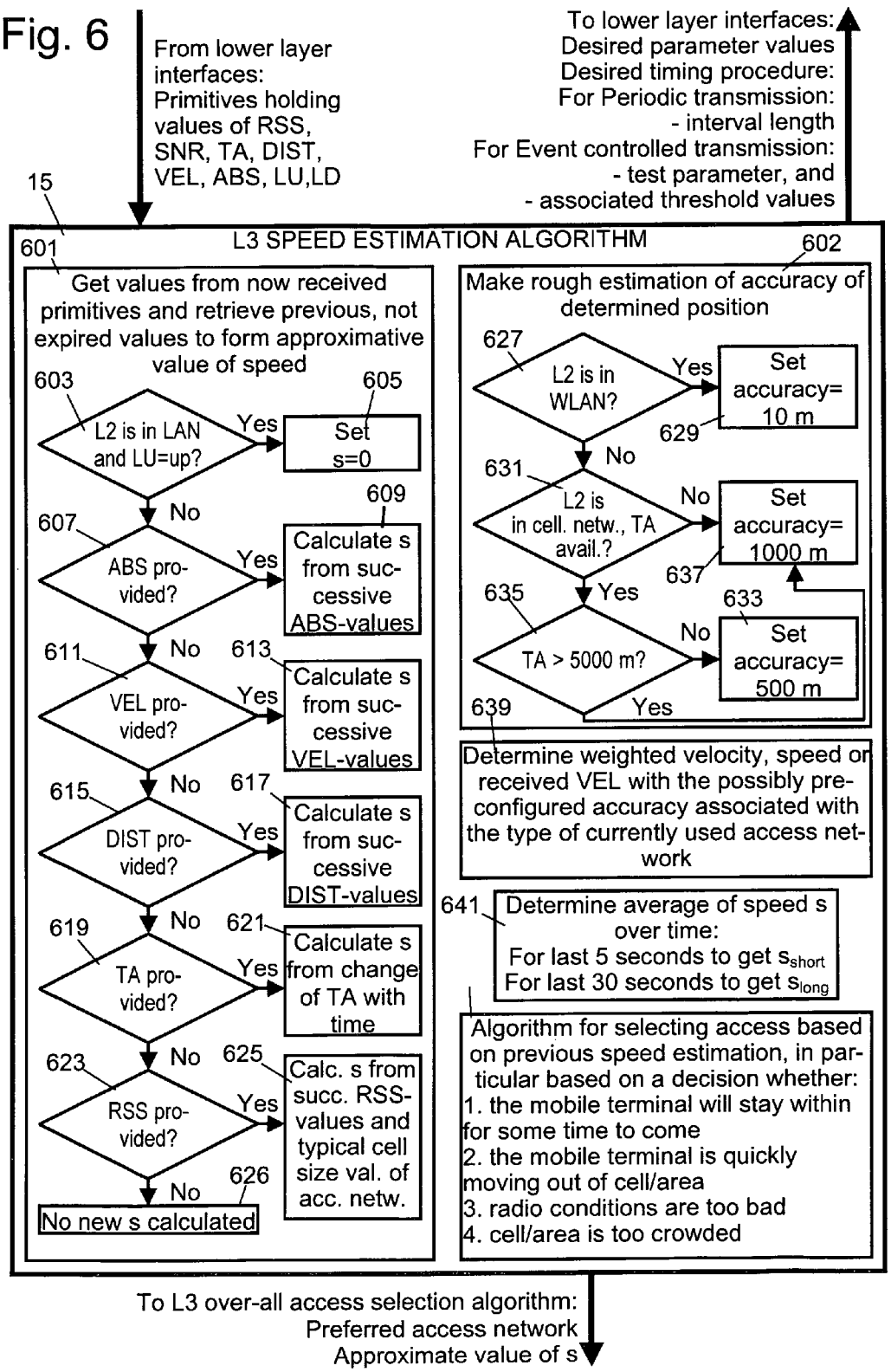
FIG. 6 is a block diagram of a circuit block for performing a speed estimation algorithm in the network layer in the communication system.

The speed estimation algorithm 15 in the network layer L3, see FIG. 6, takes input from all different lower layers and compiles the taken data to form an approximate value of the current speed of the geographical movement of the mobile terminal 1, this value called a combined value of the speed of the mobile terminal. The speed estimation algorithm 15 uses heuristics to decide whether the mobile terminal 1 will stay within the same cell 3, 5, for a given part of the lower layers, for some time to come or if it is quickly moving out of the cell, or if the radio conditions are bad or if the cell is too crowded in the cell.

The more wireless networks and the more access points 4/base stations 6 that are considered in the calculations, the better the estimation of the speed of the mobile terminal 1 will be. The speed estimation algorithm 15 in the higher layer produces output regarding the wireless network that is preferred as far as the speed of mobile terminal is concerned, this output used as input to the network layer over-all access selection algorithm 17, see the description below.

The speed estimation algorithm 15 in the higher layer L3 regularly takes or receives information as primitives from each of the lower layers attached. The values in the primitives that it receives may be generated in the next lower layer L2 or below, but from the point of view of the higher layer, they come from a specific part or portion of the lower layer L2, i.e. a network interface/network driver.

—Speed Estimation Algorithm in Higher Layer Specifying Parameters to Lower Layers—

The speed estimation algorithm 15 in the higher layer L3 does not have to use in the speed estimation all the information that it takes or receives from the lower layers.

The speed estimation algorithm in L3 is capable of specifying preferences about the primitives that it receives from the lower layers such as from L2. For each primitive, and independently per part of L2, the speed estimation algorithm 15 in L3 can set:

that this primitive will be enabled, i.e. that this primitive is to be provided or sent if the information contained in it is available,
that this primitive will be disabled,
that this primitive will be provided periodically or only at triggered events,
the interval between the times when this primitive will be provided,
a threshold that will later generate a triggered event when the primitive will be provided,
that a threshold is removed, and
that the threshold is reset to a default value.

—Definition of the Speed Estimation Algorithm in the Higher Layer—

The speed estimation algorithm 15 in the network layer L3 uses the information that it takes or receives from each lower layer to estimate whether the mobile terminal 1 is geographically moving and the approximate speed with which the mobile terminal is moving.

The speed estimation algorithm 15 is continuously collecting primitives from all lower layers and all access points 4/base stations 6 at each part of the lower layers and the algorithm extracts the parameter values in the primitives. New primitives or the values contained in the new primitives overwrite old ones in those cases where the parameter types are identical, e.g. the primitive <RSS=60%, BSA> from a part L2A of layer L2 will be overwritten by the primitive <RSS=70%, BSA>, since these primitives are the same type, they come from the same part of the layer L2 and they only contain different values, but the same primitive <RSS=60%, BSA> is not overwritten by neither the primitive <VEL=10, BSA> from the part L2A nor by the primitive <RSS=0%, BSB> from the part L2B of the layer L2. Primitives except those which hold values of LU and LD have a limited lifetime, that can typically be set to 60 seconds.

In a portion of the speed estimation algorithm 15 the geographical speed s of the mobile terminal 1 is determined, see block 601 in FIG. 6, and in another portion an estimation of the accuracy of the position of the mobile terminal is determined, see block 602, as obtained from the respective primitives. The speed estimation algorithm 15 is executed at any time, e.g. periodically or when new primitives arrive. It is executed considering all collected primitives that have not yet expired. For each part of the lower layer, e.g. L2, it makes in block 601 the following decisions:

If the part of the lower layer is associated with a network of the LAN (Local Area Network) type and the link is up (LU), see block 603, the network is a geographically fixed network, the mobile terminal 1 can be assumed not to be substantially moving, and hence s=0 is set, where s is the value of the estimated speed of the mobile terminal, see block 605.

If the part of the lower layer provides ABS, see block 607, use that over VEL, DIST, TA and RSS to calculate the velocity of the mobile terminal from the way in which the value of ABS changes over time, see block 609, and from the velocity a value of the speed s.

If the part of the lower layer provides VEL, see block 611, use that over DIST, TA and RSS to calculate the estimated velocity speed, see block 613.

If the part of the lower layer provides DIST, see block 615, use that over TA and RSS to calculate the estimated speed from the way in which DIST changes over time, see block 617.

If the part of the lower layer provides TA, see block 619, use that over RSS to calculate the estimated speed from the way in which TA changes with time, see block 621.

If the part of the lower layer provides RSS, see block 623, calculate the estimated speed from the way in which RSS changes over time and use pre-configured information about typical cell size for this wireless network type, see block 625.

In the same way, for each part of the lower layer the speed estimation algorithm 15 makes in block 602 the following decisions:

If the part of the lower layer is associated with a network of the WLAN type, see block 627, its measurements of relative position, which is used to calculate the speed of the mobile terminal 1, have an accuracy of the magnitude of order of 10 m, see block 629.

If the part of the lower layer is associated with a network of cellular type, see block 631, its measurements of the relative or absolute position of the mobile terminal, which are used to calculate the speed, have an accuracy of the magnitude of order of 500 m, see block 633.

However, if the part of the lower layer is associated with a cellular TDMA network and the TA is high, typically >5000 m, see block 635, the accuracy of the measurement of the speed of the mobile terminal is probably low and the accuracy of its measurements of relative or absolute position can hence be set to 1000 m, see block 637.

For each part of the lower layer the speed estimation algorithm 15 determines in block 639 a value of the weighted velocity or of collected or received VEL together with the possibly preconfigured accuracy associated with the type of the wireless network which is associated with the considered part of the lower layer. For instance, WLAN speed measurements have a weight 50 times (500:10) larger than those of cellular speed measurements. Based on the determination, an estimation of the physical or geographical speed s of the mobile terminal 1 is obtained. It must be observed that the speed is calculated and not the velocity. As used herein, in most cases the term "velocity" has a direction but the term "speed" never has.

In the same way, for each part of the lower layer the speed estimation algorithm 15 averages in block 639 the speed s, as determined in block 639, twice over time, see block 641. A first averaging is made for all estimated values of the speed obtained during the last 5 seconds to obtain a short average value $s_{short}$, and a second averaging is made for all estimated value of the speed obtained during the last 30 seconds to get a long average value $s_{long}$. Basically, the short average value $s_{short}$ is used to detect accelerations of the mobile terminal 1, whereas the long average value $s_{long}$ is used to detect halts, i.e. that the mobile terminal is stationary or not substantially moving.

—Algorithm for Selecting Access Based on Previous Speed Estimation—

The algorithm for selecting an access network based on calculated average values of the speed will now be described, see block 643 of FIG. 6 and the more detailed view of FIG. 7.

The important decision that this algorithm makes is which access network should be preferred at each time, given the estimation of the speed of the mobile terminal 1. For instance, when the mobile terminal is moving with a speed above a certain level, a WLAN is a bad choice and a cellular network is a much better choice.

The algorithm is preconfigured to use a LAN when the terminal is not moving, a WLAN when its moving with a low speed and otherwise a cellular network. Other access technologies can be easily added to this priority list. In the algorithm the following decisions are made:

If the short average value $s_{short}$ is 0 and a LAN is available, see block 645, choose the LAN, see block 647.

If the short average value $s_{short}$ is increasing and a WLAN or a cellular network is not yet chosen, the condition $s_{short} < s_{maxWLAN}$ is fulfilled and a WLAN is available, see block 649, choose the WLAN, see block 651. The threshold value $s_{maxWLAN}$ can typically be set to 7 m/s.

If the long average value $s_{long}$ is decreasing, a WLAN is not yet chosen and the condition $s_{long} < s_{maxWLAN}$ is fulfilled and a WLAN is available, see block 653, choose the WLAN, see block 655.

If the speed estimations, the calculation of which has been described above, from two different parts of the lower layer differ fundamentally from each other, such a by several orders of magnitude, a moving network can be suspected and it can be preferred to assume that the currently used access network, associated with the corresponding part of the lower layer, is stable, see blocks 657 and 659, and that no change should be made. An example is a WLAN hotspot in a moving vehicle, having some cellular coverage outside the moving vehicle. Another example would be the case when a mobile terminal 1 is moving at a constant distance from a base station 6.

If none of the above is true, choose a cellular network, see block 661.

A WLAN is basically not designed for any movements of mobile terminals at all, but it can at least handle some low speeds of the mobile terminals. The typical value 7 m/s (=25 km/h) mentioned above is related to the time period that a typical IP layer mobility mechanism handoff takes. Handing off into a WLAN cell plus handing off out from the same cell may take 4+2 seconds, but the actual values may of course be much lower. If the cell radius is around 50 m the mobile terminal may cross it at a chord ranging from 100 m, crossing through the center, down to 0 m, just being a tangent to the cell. An average chord may be 50 m. The terminal will stay 7 seconds in the cell if moving with a speed of 7 m/s.

The access network chosen by this algorithm illustrated in block 643 becomes one of the output parameters that are fed into the IP layer over-all access selection algorithm 17.

It can be observed that the access network selected here is not the final decision made by the system. This is only the best choice depending on the estimated speed s of the terminal 1.

—Output from Speed Estimation Algorithm—

The speed estimation algorithm 15 described above provides an output indicating the most suitable access network to be used by the mobile terminal 1, e.g. a WLAN or a cellular network.

The speed estimation algorithm also outputs an estimation of the speed s of the mobile terminal that can be used by any part of the wireless communication system.

Over-all Access Selection Algorithm 17 in Higher Layer

Figure 8:
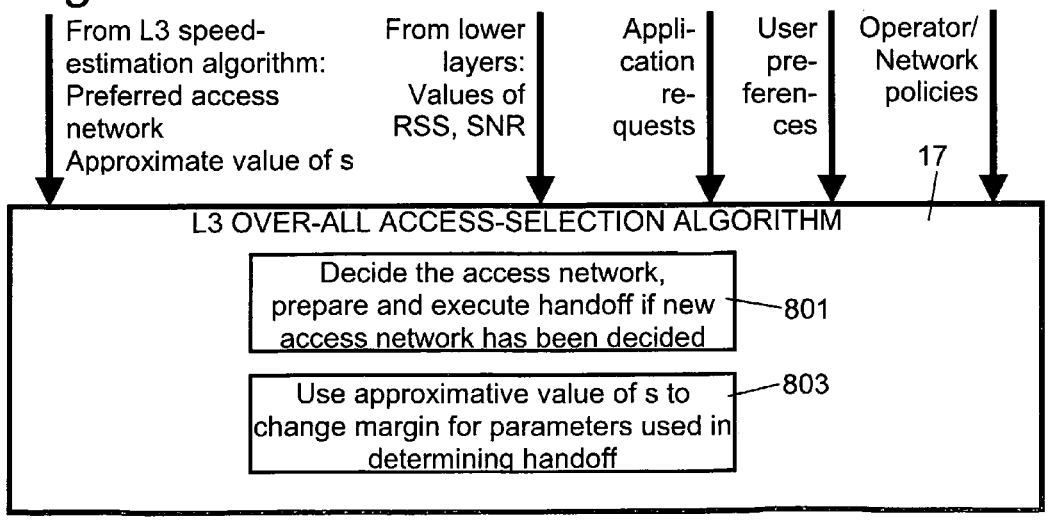
FIG. 8 is a block diagram of a circuit block for performing an over-all access selection algorithm in the network layer of the communication system.

The output of the speed estimation algorithm 15 is one of multiple input parameters to the over-all access selection mechanism 17, see FIG. 8, that manages the network layer L3. Other input to the access selection mechanism can come from lower layers, such as RSS and SNR directly from the drivers and not via the speed estimation algorithm in the network layer, from applications, policies, user selection or network instructions.

The over-all access selection algorithm 17 is constantly running and is at each moment trying to select the access network that best matches, given all incoming status information, all incoming requirements, see block 801 in FIG. 8.

The speed estimation algorithm 15 performed in the same layer as described above is one of the sources for status information input. Another example is topological movement detection, which bases its movement detection on IP layer mechanisms such as IPv6 (Internet protocol version 6) Neighbor Discovery, see T. Narten et al., "RFC 2461— Neighbor Discovery for IP Version 6 (IPv6)", IETF, December 1998.

The requirements for access selection can come from, but is not limited to:

Application requests over the socket API (Application Programming Interface).

User preferences e.g. set through a user interface for access management.

Policy database e.g. defined by the operator/network/communication system.

A detailed definition of the manner in which these requirements are specified is not described herein since it is well specified in existing systems.

The decision taken by the over-all access-selection algorithm 17 affects the routing inside the mobile terminal 1. For instance, the decision to change to another access network may change the primary interface and change the default route.

However, the following should be observed. The process of selecting an access network and finally finishing the handoff may be a long procedure. If an access point 4 for a WLAN is within reach, it does not automatically mean that the mobile terminal 1 can handoff to it and restore connectivity. The mobile terminal may have to authenticate first, and then begin signaling different mobility protocols. The handoff operation is not completed at the same moment at which the selection of the preferred access network is done. There may be several steps in between and they will take time and may fail. The access selection will still keep indicating to the communication system the access network that is the preferred one. Further details of this procedure can be obtained from prior art systems.

—Using Estimated Speed s to Change Handoff Boundaries—

Apart from the speed estimation algorithm 15 described above that decides an appropriate access network based on the speed of the mobile terminal 1, the estimated speed s obtained from the same algorithm can be used to change other handoff decisions.

When the RSS within a cell 5 drops below a boundary it is time to handoff to another cell. A small margin, e.g. defined as a fraction of RSS or SNR, should cater for the few seconds that a handoff operation performed by a L3 mobility mechanism requires without losing information packets.

However, depending on the speed with which the mobile terminal 1 moves the optimal margin varies. When moving slowly, the margin can be small and when moving faster, the margin must be larger.

Figure 9:
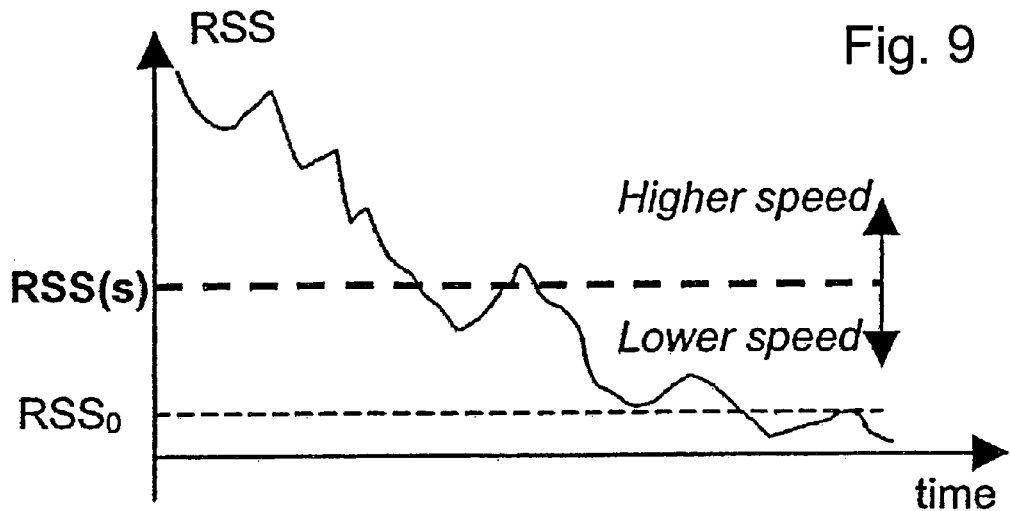
FIG. 9 is a graph illustrating the value of the received signal strength for a mobile terminal as a function of time, the graph also illustrating adapting a variable RSS threshold dependent on the estimated value of the speed s of the mobile terminal.

The estimated speed s that the speed estimation algorithm 15 as described above provides can be used to increase and decrease a threshold of RSS or SNR that is used for handoff decisions, see block 803 of FIG. 8. In the diagram of FIG. 9 a variable RSS threshold value RSS(s) is illustrated as dependent on the value s of the estimated speed, the threshold value triggering a handoff operation. The threshold value RSS(s) increases when the speed s increases, and vice versa. $RSS_0$ is a threshold value that is independent of the speed and works as a second choice if a speed estimation is not available. In the cited article for Austin et al. the estimated speed of a mobile terminal in a cellular network is used for adapting a temporal window over which averages of signal strengths are taken.

This improved mechanism can be used for handoff operations for mobile terminals within one access technology or between different access technologies. If used for handoff decisions in a cellular network, this procedure is executed in the relevant base stations instead of being executed in the mobile terminals.

—Advantages—

Even if only rough information about the approximate speed of the geographical movement of a mobile terminal 1 is available it is possible to make better predictions, whether the mobile terminal should perform a handoff operation or change the access network, and/or when it would be an appropriate time to do so.

In most cases it is enough to be capable of determining the order of magnitude of the speed s of the mobile terminal 1.

If the mobile terminal is not moving, the radio conditions are not expected to change, which can be interpreted as:
There is no need to select an access network having a wider coverage.
In fact, it is possible to select an access network having a narrower coverage.
There is no urgency to perform a handoff operation.

By combining information from a plurality of parts of lower layers and from a plurality of cells within each lower layer, it is possible to form a better picture of the actual geographical movement of the mobile terminal 1.

Thus, the method and wireless communication system as described herein do not require accurate information from each part of the lower layers, such as absolute position, speed etc. The described method/system is not a positioning/localizing method/system—such a method/system would require a much higher accuracy but would have completely different requirements and goals.

The use of normalized primitives between the lower layers and the speed estimation algorithm performed in the higher layer makes the algorithm in the higher layer be independent of radio parameter values and makes it capable of comparing information received from different access technologies. It also makes it easier for the operating system manufacturer to push driver manufacturers to provide useful radio information upwards.

The method and wireless communication system as described herein do not require any additional hardware, such as a GPS receiver to estimate speed and improve access selection. The described method and communication system can be implemented using existing hardware including only modifications to the software, making them less expensive.

The method and communication system as described herein do not require that the wireless networks are coordinated. Furthermore, they also allow the mobile terminals to use information from multiple different wireless networks that will provide more accurate estimates of the speed. The implementation of the described method primarily deals with access selection between different access types. Thus, it will in some respects be simpler than a method would be for performing handoff operations within a single wireless network, since there are no synchronization problems between base stations belonging to different wireless networks.

It is possible to use the estimated speed also for handoff decisions between cells within a single wireless network.

An implementation of the method and communication system as described herein would make a mobile terminal 1 avoid handing off into a cell of small size when the mobile terminal is passing through such a cell at a high speed or handing over from a cell of small size to a larger cell if the speed of the mobile terminal gets to high, thus avoiding some or all of the following:
Loss of information packets, both due to handoff and the fact that the small size cell may not support a mobile terminal moving that fast, because radio circuits of the mobile terminal are not designed for a fast moving mobile terminal.
Information packets sent or delivered out of order.
Latency variations.
Unnecessary mobility management signaling.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

The invention claimed is:

1. A mobile terminal for use in a communication system for communicating information, the communication system including at least two networks, the mobile terminal comprising:
   a processor; and
   communication circuits for wirelessly communicating with each of said at least two wireless networks, the communication circuits including:

a plurality of circuit blocks, each performing a specific function in the communication between the mobile terminal and at least one access point in at least one of said at least two wireless networks, the plurality of circuit blocks including speed estimation circuit blocks for estimating the speed with which the mobile terminal moves, the speed estimation circuit blocks arranged to communicate estimated values of said speed to a selection module arranged to select, based on said estimated values of the speed, one of said at least two wireless networks for communicating information from and to the mobile terminal, wherein first ones of the speed estimation circuit blocks are particular for each of said at least two wireless networks, so that each of said first ones of the speed estimation circuit blocks is arranged to estimate or determine values of the current position or of the speed of the mobile terminal based on the communication with only access points of an individual one of said at least two wireless networks, and wherein a second, different one of the speed estimation circuit blocks is connected to said first ones of the speed estimation circuit blocks for receiving said estimated or determined values, the second one of the speed estimation circuit blocks is arranged to calculate, a combined value of the speed of the mobile terminal based on said received estimated or determined values.

2. The mobile terminal according to claim 1 wherein each of said particular speed estimation circuit blocks is arranged to transfer said at least estimated values of the current position or of the current speed of the mobile terminal to the second one of the speed estimation circuit blocks, said at least estimated values being determined in the respective particular speed estimation circuit block.

3. The mobile terminal according to claim 1, wherein each of said particular speed estimation circuit blocks is arranged to transfer values of parameters associated with the mobile terminal to the second one of the speed estimation circuit blocks as individual messages or separate items of information, each message or item of information only holding a value of one of the parameters.

4. The mobile terminal according to claim 1, wherein each of said particular speed estimation circuit blocks is arranged to also transfer values of parameters directly associated with or derived from the wireless transmission between the mobile terminal and a respective access point of one of said at least two wireless networks, said parameters in particular including at least one of received signal strength, signal-to-noise ratio and timing advance, to the second one of the speed estimation blocks.

5. A mobile terminal according to claim 1 wherein each of said particular speed estimation circuit blocks is arranged to transfer values of parameters associated with the mobile terminal to the second one of the speed estimation circuit blocks periodically and/or when a value of one of the parameters passes a threshold value.

6. The mobile terminal according to claim 1 wherein said particular speed estimation circuit blocks are arranged to transfer values of parameters using a selected one of:
a software interrupt,
a function call and/or a callback function, and
a messaging service of an operating system.

7. The mobile terminal according to claim 1, wherein one of said particular speed estimation circuit blocks is arranged to determine an estimated value of the speed of the mobile terminal based on successive estimated values of the distance of the mobile terminal from an access point of one of said at least two wireless networks.

8. The mobile terminal according to claim 7, wherein said one of said particular speed estimation circuit blocks is arranged to determine an estimated value of the distance of the mobile terminal from an access point based on a cell radius for said access point, the transmission power used in communication with said access point and the strength of signals received from said access point.

9. The mobile terminal according to claim 7, wherein said one of said particular speed estimation circuit blocks is arranged to determine an estimated value of the distance of the mobile terminal from an access point based on the timing advance detected in communicating with the access point.

10. The mobile terminal according to claim 1, wherein the second one of the speed estimation circuit blocks is arranged to determine the combined value to be equal to zero when information received from said particular speed estimation circuit blocks indicates that the mobile terminal is in communication with an access point of a local area network.

11. The mobile terminal according to claim 1, wherein the second one of the speed estimation circuit blocks is arranged to determine the combined value from successive estimated values of the distance of the mobile terminal from an access point of one of said at least two wireless networks, as received from one of said particular speed estimation circuit blocks.

12. The mobile terminal according to claim 1, wherein the second one of the speed estimation circuit blocks is arranged to determine the combined value from changes of values of the timing advance detected in communicating with the access point, as received from one of said particular speed estimation circuit bocks.

13. The mobile terminal according to claim 1, wherein the second one of the speed estimation circuit blocks is arranged to determine the combined value from successive values of the strength of signals received from one access point and predetermined values of a cell size and of transmission power associated with said access point.

14. The mobile terminal according to claim 1, wherein the second one of the speed estamation circuit blocks is arranged to determine a value of an accuracy of the combined value.

15. The mobile terminal according to claim 1, wherein the selection module is a selection circuit block in the mobile terminal, the selection circuit block connected to the speed estimation circuit blocks, in particular to only the second one of the speed estimation circuit blocks.

16. The mobile terminal according to claim 15, wherein the selection circuit block is arranged to adapt a threshold value or a margin for a parameter used in selecting the wireless network, with which the mobile terminal is to communicate information, in particular threshold value for the strength of or for the signal-to-noise ratio of signals received from said at least two wireless networks.

17. A mobile terminal for use in a communication system for communicating information, the communication system including at least two wireless networks, the mobile terminal comprising:
a processor; and
communication circuits for wirelessly communicating with each of said at least two wireless networks, the communication circuits including:
a plurality of circuit blocks for each performing a specific function in the communication between the mobile terminal and at least one access point in at least one of said at least two wireless networks, the plurality of circuit blocks including speed estimation circuit blocks for estimating the speed with which the mobile terminal moves, the speed estimation circuit blocks arranged to communicate estimated values of said speed to a selection module arranged to select, based on said estimated values of the speed, one of said at least two wireless networks for communicating information from and to the mobile terminal, wherein the circuit blocks are organized in a layer system including a network layer and at least one lower layer, the network layer including circuit blocks handling communication between the mobile terminal and said at least two networks on a network level, and said at least one lower layer including circuit blocks handling the physical transmission of information between the mobile terminal and access points of said at least two wireless networks, and wherein first ones of the speed estimation circuit blocks are included in said at least one lower layer, and a second, different one of the speed estimation circuit blocks is included in the network layer, wherein the first ones of the speed estimation circuit blocks are arranged to transfer at least estimated values of the current position of or of the speed of the mobile terminal to the second one of the speed estimation circuit blocks; and wherein the second one of the speed estimation circuit blocks is connected to said first ones of the speed estimation circuit blocks for receiving said estimated values and is arranged to calculate, a combined value of the speed of the mobile terminal based on said received estimated values.

18. The mobile terminal according to claim 17, wherein the first ones of the speed estimation circuit blocks include speed estimation circuit blocks particular for each of said at least two wireless networks.

19. The mobile terminal according to claim 17, wherein the second one of the speed estimation circuit blocks is arranged to combine information, in particular including values of estimated position end/or of speed of the mobile terminal, received from said particular speed estimation circuit blocks to give a combined value of the speed of the mobile terminal.

20. A communication system for communicating information comprising:

a wireless network system having at least two access points each covering a different area, and a mobile terminal adapted to wirelessly communicate with the wireless network system through suitable ones of said at least two access points, a speed estimation function for estimating the speed with which the mobile terminal moves;

a selection function for selecting, based on estimated values of said speed received from the speed estimation function, one of said at least two access points for communicating information from and to the mobile terminal, wherein the system is in a layer system for the communication including a network layer and at least one lower layer, the network layer handling communication between the mobile terminal and the wireless network system on a network level and the at least one lower layer handling the physical transmission of information between the mobile terminal and said at least two access points, wherein a first part of the speed estimation function is located in or performed on said at least one lower layer, and a second part of the speed estimation function is located in or performed on the network layer, wherein the first part is arranged to transfer at least estimated values of the current position or of the speed of the mobile terminal to the second part; and wherein the second part of the speed estimation function is connected to said first part of the speed estimation function for receiving said estimated values and is arranged to calculate, a combined value of the speed of the mobile terminal based on said received estimated values.

21. The communication system according to claim 20, wherein the first part of the speed estimation function includes different portions, each of said different portions associated only with the communication with an individual one of said at least two different access points.

22. The communication system according to claim 21, wherein each of said portions of the first part is arranged—to determine at least estimated values of the current position or of the current speed of the mobile terminal, and—to transfer said at least estimated values of the current position or of the current speed of the mobile terminal determined in the respective portion of the first part to the second part of the speed estimation function.

23. The communication system according to claim 21, wherein the second part of the speed estimation function is arranged to combine information, the information in particular including values of estimated position and/or speed of the mobile terminal, received from the portions of first part to give a combined value of the speed of the mobile terminal.

24. The communication system according to claim 20, wherein the first part is arranged to transfer values of parameters associated with the mobile terminal to the second part as individual messages or separate items of information, each message or item of information only holding a value of one of the parameters.

25. The communication system according to claim 20, wherein said values of parameters, including said estimated values of the current position or of the speed, are determined, in particular measured, calculated or estimated, in or by the first part.

26. The communication system according to claim 20, wherein the first part is arranged to also transfer values of parameters directly associated with the wireless transmission between the mobile terminal and one of said at least two access points of the wireless network system, said parameters in particular including at least one of received signal strength, signal noise ratio and timing advance, to the second part.

27. The communication system according to claim 20, wherein the first part is arranged to transfer values of parameters associated with the mobile terminal to the second part periodically and/or when a value of one of the parameters passes a threshold value.

28. The communication system according to claim 27, wherein the first part is arranged to transfer the values of the parameters using a selected one of:

a software interrupt,—a function call and/or a callback function, and a messaging service of an operating system.

29. The communication system according to claim 20, wherein the selection function is arranged to adapt a threshold value or a margin for a parameter used in selecting that one of said at least two access points, with which the mobile terminal is to communicate information, in particular a threshold value for the strength of or for the signal-to-noise ratio of signals received from said at least two access points.

30. A method of communicating information in a communication system, the communication system including a wireless network system having at least two access points covering different areas, and a mobile terminal, wherein the communicating of information is handled by functions in a layer system including a network layer and at least one lower layer, wherein functions of the network layer handle communication between the mobile terminal and the network on a network level and wherein functions of the at least one lower layer handle the physical transmission of information between the mobile terminal and said at least two access points, the method comprising:

transmitting information wirelessly between the wireless network system and the mobile terminal through a selected one of said at least two access points, estimating the speed with which the mobile terminal moves to give estimated speed values, and changing the selected one of said at least two access points, between which the mobile terminal information is wirelessly transmitted, based on said estimated speed values, wherein the estimating of the speed is performed both in first substeps performed in said at least one lower layer and in a second substep performed in the network layer, and at least estimated values of the current position or of the speed of the mobile terminal are transferred from the first substeps to the second substep; and wherein the second substep is for receiving said estimated values and is arranged to calculate, a combined value of the speed of the mobile terminal based on said received estimated values.

31. The method according to claim 30, wherein the first substeps are performed in different portions of the communication system, each of said different portions associated only with the communication with in an individual one of said at least two different access points.

32. The method according to claim 30, wherein, the step of estimating further comprises, in each of the first substeps, at least estimated values of the current position or of the current speed of the mobile terminal are determined, and all of said at least estimated values of the current position or at the current speed of the mobile terminal determined in all of the first substeps are transferred to the second substep.

33. The method according to claim 30, wherein in the second substep information is combined, the information in particular including values of the estimated position and/or of the speed of the mobile terminal, received from the first substeps to give a combined value of the speed of the mobile terminal.

34. The method according to claim 30, wherein in the first substeps values of parameters associated with the mobile terminal are transferred to the second substep as individual messages or separate items of information, each message or item of information only holding a value of one of the parameters.

35. The method according to claim 30, wherein in the first substeps, said values of parameters, including said estimated values of the current position or of the speed, are determined, in particular measured, calculated or estimated, in as function or functions performed in the at least one lower layer.

36. The method according to claim 30, wherein in the first substeps, also values of parameters directly associated with the wireless transmission between the mobile terminal and one of said at least two access points of the network system, said parameters in particular including at least one of received signal strength, signal noise ratio and timing advance, are transferred to the second substep.

37. The method system according to claim 36, wherein from the first substeps the values of the parameters are transferred using a selected one of:

a software interrupt, a function call and/or a callback function, and a messaging service of an operating system.

38. The method according to claim 36, wherein from each of the first substeps values of parameters associated with the mobile terminal are transferred to the second substep as individual messages or separate items of information, each message or item of information only holding a value of one of the parameters.

39. The method according to claim 30, wherein from the first substeps values of parameters associated with the mobile terminal are transferred to the second substep periodically and/or when a value of one of the parameters passes a threshold value.

40. The method according to claim 30, wherein in the step of changing, a threshold value or a margin for a parameter is adapted that is used in selecting that one of said at least two access points, with which the mobile terminal is to communicate information, in particular a threshold value for the strength of or for the signal-to-noise ratio of signals received from said at least two access points.

\* \* \* \* \*

UNITED STATES PATENT AND TRADEMARK OFFICE
CERTIFICATE OF CORRECTION

PATENT NO. : 8,112,111 B2
APPLICATION NO. : 11/720870
DATED : February 7, 2012
INVENTOR(S) : Pettersson et al.

It is certified that error appears in the above-identified patent and that said Letters Patent is hereby corrected as shown below:

On the Title Page:

Item (73), under "Assignee", in Column 1, Line 1, delete "Telefonaktiebolget" and insert -- Telefonaktiebolaget --, therefor.

Item (56), under "OTHER PUBLICATIONS", in Column 2, Line 1, delete "Majiesi," and insert -- Majlesi, --, therefor.

In the Drawings:

In Fig. 5, Sheet 5 of 8, for Tag "515", in Line 1, delete "transmissionof" and insert -- transmission of --, therefor.

In Fig. 6, Sheet 6 of 8, delete "  " and insert --                 --, therefor.

Figure 7:
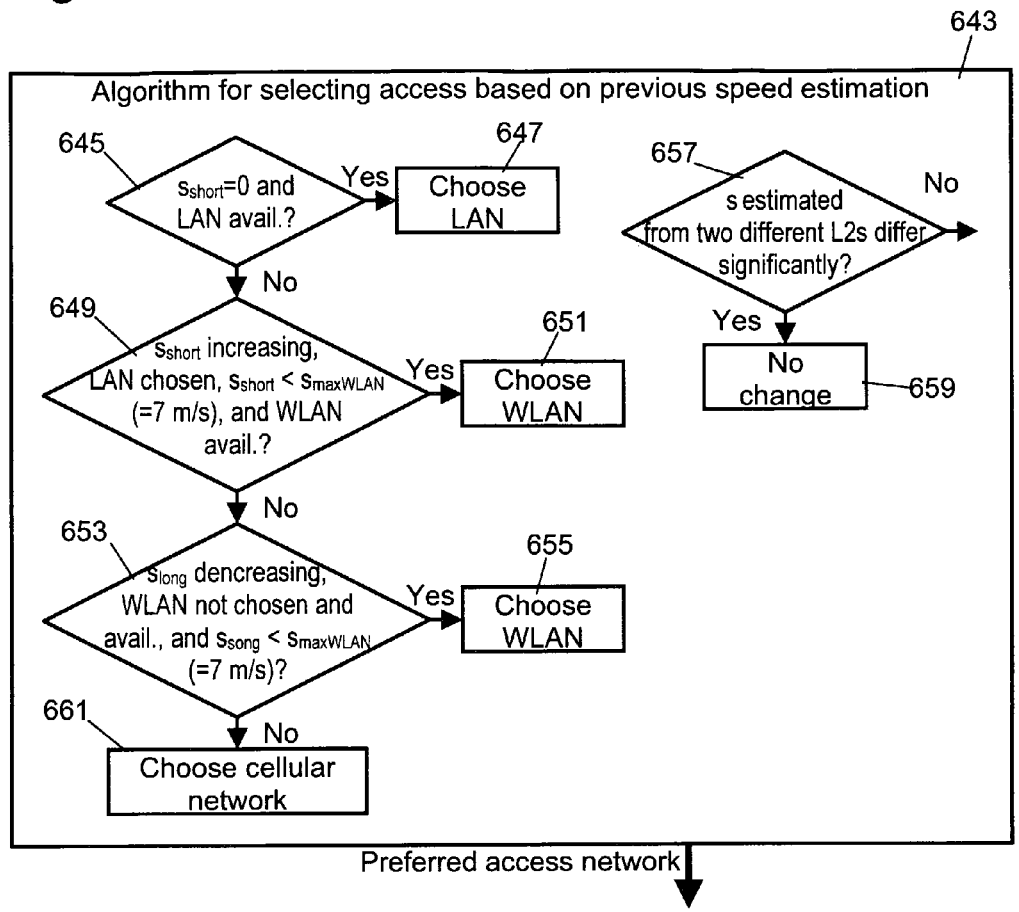
FIG. 7 is a block diagram of a circuit block for performing an access selection algorithm included in the speed estimation algorithm of FIG. 6.

In Fig. 7, Sheet 7 of 8, for Tag "653", in Line 1, delete "dencreasing," and insert -- decreasing, --, therefor.

In the Specifications:

In Column 1, Line 62, delete "or choosing en" and insert -- for choosing an --, therefor.

In Column 13, Line 55, delete "a" and insert -- as --, therefor.

Signed and Sealed this
Third Day of July, 2012

David J. Kappos
*Director of the United States Patent and Trademark Office*

CERTIFICATE OF CORRECTION (continued)
U.S. Pat. No. 8,112,111 B2

In the Claims:

In Column 17, Line 29, in Claim 2, delete "claim 1" and insert -- claim 1, --, therefor.

In Column 17, Line 53, in Claim 5, delete "A" and insert -- The --, therefor.

In Column 18, Line 33, in Claim 12, delete "bocks." and insert -- blocks. --, therefor.

In Column 18, Line 41, in Claim 14, delete "estamation" and insert -- estimation --, therefor.

In Column 20, Line 15, in Claim 22, delete "–to" and insert -- to --, therefor.

In Column 20, Line 17, in Claim 22, delete "–to" and insert -- to --, therefor.

In Column 20, Line 34, in Claim 25, delete "claim 20," and insert -- claim 24, --, therefor.

In Column 20, Line 54, in Claim 28, delete "–a" and insert -- a --, therefor.

In Column 21, Line 33, in Claim 32, delete "comprises," and insert -- comprises: --, therefor.

In Column 21, Line 38, in Claim 32, delete "at" and insert -- of --, therefor.

In Column 22, Line 10, in Claim 35, delete "as" and insert -- a --, therefor.

In Column 22, Line 20, in Claim 37, delete "method system" and insert -- method --, therefor.